Patented Mar. 26, 1940

2,195,076

UNITED STATES PATENT OFFICE 2,195,076

PROCESS OF REPLACING HALOGEN IN CYCLIC HALOGEN COMPOUNDS AND PRODUCT THEREOF

Willy Braun, Mannheim, and Karl Koeberle, Ludwigshafen-on-the-Rhine, Germany, assignors to General Aniline & Film Corporation, a corporation of Delaware No Drawing. Application October 21, 1937, Serial No. 170,222. In Germany October 24, 1936

7 Claims. (Cl. 260—465)

The present invention relates to a process of replacing halogen in cyclic halogen compounds and to cyano compounds obtainable by the said process.

We have found that halogen in cyclic halogen compounds can be readily replaced by acting with cuprous cyanide on the cyclic halogen compounds while using the cuprous cyanide in the form of a double compound which is soluble in the reaction mixture and in the absence of substances capable of dissolving cuprous cyanide.

The halogen derivatives of cyclic compounds to be reacted may belong to a great variety of series. Thus, for example, the initial material may be halogen compounds of the benzene, naphthalene, anthracene, diphenyl, phenanthrene, pyrene or chrysene series, or halogen derivatives of the corresponding heterocyclic compounds, as for example pyridines, quinolines, azaphenanthrenes, quinazolines, pyrazines, diphenylene oxides, acridones, thioxanthones, carbazoles, anthrapyrimidines and azabenzanthrones containing halogen. Among the halogen derivatives, the bromine and iodine compounds are especially suitable. The halogen may be present on a nuclear carbon atom of the said series of compounds, or at any point in a side chain, or in both positions. When using chlorine compounds as initial materials, it is advantageous to select those in which the chlorine is rendered movable by virtue of its position, in particular by certain adjacent atoms or atomic groups. Compounds having such movable chlorine atoms are for example ortho-chlorphthaloyl compounds, such as 1-chloranthraquinones, or 8-chlorquinolines, and also chlorine compounds in which nitro or free or modified carboxylic groups or other activating atoms or groups are present in ortho position to chlorine. Chlorine compounds having aliphatically-combined chlorine, the chlorine atoms of which are rendered movable by an adjacent aryl radical, for example as in benzyl chloride, are also quite suitable.

For a satisfactory carrying out of the reaction it is usually sufficient to use about the calculated amount of cuprous cyanide or only a slight excess above the said amount. Thus the procedure is usually that a mixture of the halogen compound and the cuprous cyanide are heated in the presence of a substance which is capable of forming a double compound with the cuprous cyanide which is soluble in the reaction mixture. Generally speaking it is not necessary to start from the ready-made double compound but to allow its formation in the reaction mixture. The amount of organic compound capable of forming the double compound is about one molecular proportion calculated on one molecular proportion of cuprous cyanide. In some cases even smaller amounts of the former may suffice. It is essential not to use such quantities thereof as may act as diluent since thereby the outputs are affected and undesired by-reactions occur. It is also not essential to start from ready-made cuprous cyanide but it may be formed at the commencement of or during the reaction, for example from copper salts and alkali metal cyanides. This method of working has proved of special advantage.

As compounds which are capable of forming double compounds with the cuprous cyanide there may be mentioned for example bases of the nature of pyridine or quinoline and the corresponding hydrogenated compounds (as for example piperidine, lutidine and hydroquinolines), benzylcyanide, benzonitrile, cyclohexylamines, and also alkylamines, aralkylamines, arylamines, alkylolamines, dialkylamines and trialkylamines. In many cases, it is preferable to add inorganic salts, preferably copper salts, such as cuprous halides, and also ammonium salts, or halides of alkali metals, aluminium, zinc, mercury or iron.

It has already been proposed in the reaction of halogen compounds the halogen atom of which is combined with a carbon atom standing in a ring, with copper cyanide to use pyridine or benzyl cyanide as diluent or solvent. This known method of working, however, has several disadvantages. In order to effect the reaction in a satisfactory manner by using pyridine, it is necessary to allow the reaction to proceed for a relatively long time and to use closed vessels. Benzyl cyanide may be employed as diluent only in certain cases with a satisfactory result since it is relatively easily decomposed. These disadvantages are definitely avoided by working according to the present invention. The reaction is generally carried out without the use of a diluent. In cases, however, in which the reaction is exothermic an excess of the halogen compound may be used with advantage as diluent. In other cases in which the halogen compound used has a high melting point, it is indicated to use a diluent. As such diluents the usual non-expensive liquids such as nitrobenzene, alkoxybenzenes or naphthalenes may be employed. In cases in which the reaction proceeds very rapidly either usual diluents such as chlorbenzenes, or amides such as formamide or acetamide may be employed. It is a further advantage of the present invention that it allows the production of a great variety of new valuable cyano compounds which are not available according to any known method. In contradistinction to the methods so far used and described above the process according to the present invention can be employed for the replacement of chlorine in most various halogen derivatives. Due to the fact that in almost all cases the reaction vessels may be relatively small, also the reaction time is generally speaking very short and the separation of the end products may be effected in a very simple manner. In cases in which the amount of a diluent is relatively high (which is the case if compounds having a high melting point are employed as starting materials) the end products may also be separated in a very simple manner since the resulting cyano compounds are generally speaking relatively difficultly soluble.

The yields obtained according to this invention are usually very good and in many cases correspond to the calculated yields. The final products are also usually very pure. If necessary they may be purified in the usual manner, as for example by distillation, if desired under reduced pressure and/or with the aid of steam, by sublimation or, in suitable cases, by way of their salts. In many cases the final product may be freed from accompanying cuprous halide by treatment with strong halogen hydracids, in particular with hydrochloric acid; this offers the further advantage that the resulting solution of cuprous halide may readily be converted by treatment with alkali metal cyanides and a little sulphurous acid into cuprous cyanide which is then available for further reactions.

It is also possible to work up the reaction mixture by adding an excess of a solution of an alkali metal cyanide whereby the copper salts are dissolved in the form of complexes from which they may be recovered in a simple manner as cuprous cyanide.

The compounds obtainable according to the present invention are for the greatest part new. They are very valuable starting materials for the preparation of dyestuffs or of medicaments. In some cases they are themselves medicaments or also dyestuffs. For example, they may be, in some cases, employed for dyeing acetate artificial silk, or as vat dyestuffs. Furthermore, they may be partly or wholly saponified thus yielding the corresponding carboxylic amides or the corresponding carboxylic acids themselves. The latter compounds as well as the cyano compounds themselves are very valuable for the production of azo dyesuffs. Some of the cyano compounds obtainable according to our invention may also be subjected to a polymerizing treatment or to a treatment with condensing agents thus giving valuable high-molecular compounds which are suitable as artificial masses and the like.

The following examples will further illustrate how our said invention may be carried out in practice but the invention is not restricted to these examples. The parts are by weight.

*Example 1*

A mixture of 50 parts of ortho-chlornitrobenzene, 29 parts of cuprous cyanide and 26 parts of pyridine is heated for some hours at from 180° to 185° C. while stirring. It is then poured into ice-cold strong hydrochloric acid and the deposited ortho-cyanonitrobenzene is filtered off by suction and washed with water. The yield amounts to about 90 per cent of the calculated yield.

In the same manner it is obtained in almost the calculated yield 3-nitro-4-cyano-1-methylbenzene from 3-nitro-4-chlor-1-methylbenzene, 3-cyano-2-nitro-1-methylbenzene from 3-chlor-2-nitro-1-methylbenzene, 5-cyano-4-nitro-2-amino-1-methylbenzene from 5-chlor-4-nitro-2-amino-1-methylbenzene and 1-cyano-2-nitro-4-chlorbenzene from 1.4-dichlor-2-nitrobenzene.

*Example 2*

A mixture of 500 parts of ortho-chlorbenzoic acid, 287 parts of cuprous cyanide, 250 parts of pyridine and 260 parts of nitrobenzene is heated at from 170° to 175° C. until it no longer contains ortho-chlorbenzoic acid, which is usually the case after about an hour. The nitrobenzene is then evaporated off and the residue is purified by sublimation under reduced pressure. Instead of the cyanobenzoic acid which was to be expected, there is obtained a good yield of phthalimide which has been formed by arrangement of the acid.

By starting from derivatives of ortho-chlorbenzoic acid, as for example from 2-chlor-5-methylbenzene-(1)-carboxylic acid, the appropriate derivatives of phthalimide are obtained.

*Example 3*

A solution of 500 parts of 1-chlor-2-aminoanthraquinone, 200 parts of cuprous cyanide and 230 parts of cyclohexylamine in 2400 parts of nitrobenzene is heated at from 160° to 165° C. until a sample withdrawn yields a pure blue vat, which is usually the case after some hours. After cooling, the whole is filtered by suction and the residue washed with nitrobenzene and then with dilute hydrochloric acid and water. 1-cyano-2-aminoanthraquinone is thus obtained in the calculated yield in the form of yellow-red needles which dissolve in strong sulphuric acid giving a yellow coloration and which yields a blue vat. Pyridine, piperidine or triethanolamine may be used instead of cyclohexylamine.

By starting from 1-chlor-4-amino- or -5-aminoanthraquinone there is obtained 1-cyano-4-amino- or -5-aminoanthraquinone, from 1,3-dichlor-2-aminoanthraquinone 1-cyano-2-amino-3-chloranthraquinone, and from 1.4-diamino-2-bromoanthraquinone 1.4-diamino-2-cyanoanthraquinone.

*Example 4*

A mixture of 250 parts of 1-amino-2-bromoanthraquinone, 80 parts of cuprous cyanide, 75 parts of pyridine and 900 parts of nitrobenzene is heated at from 200° to 210° C. until initial material can no longer be detected, the whole then being worked up in the manner described in Example 3. 1-amino-2-cyano-anthraquinone is thus obtained in the calculated yield.

2-amino-3-bromoanthraquinone may be converted into 2-amino-3-cyanoanthraquinone in the same way.

2-cyano-3-hydroxyanthraquinone is obtained in the same manner from 2-brom-3-hydroxyanthraquinone.

*Example 5*

A mixture of 50 parts of ortho-bromotoluene, 27 parts of cuprous cyanide and 24 parts of pyridine is heated for some hours at from 190° to 195° C. Pure 1-cyano-2-methylbenzene is obtained by distillation under reduced pressure. The yield is more than 90 per cent of the calculated yield.

Example 6

A mixture of 50 parts of para-dibromobenzene, 38 parts of cuprous cyanide and 34 parts of pyridine is heated for some hours at from 175° to 190° C. while stirring. The para-dicyanobenzene obtained may be purified by sublimation under reduced pressure.

Example 7

A melt of 500 parts of para-bromaniline, 265 parts of cuprous cyanide and 240 parts of pyridine is heated for some hours at 180° C. and then worked up in the manner described above. 1-amino-4-cyanobenzene is thus obtained in a very good yield.

By starting from 1-amino-2-nitro-4-brombenzene 1-amino-2-nitro-4-cyanobenzene is obtained in almost the calculated yield.

Example 8

A mixture of 50 parts of 8-chlorquinoline, 28 parts of cuprous cyanide and 40 parts of quinoline is heated for some hours at from 240° to 245° C. By distilling under reduced pressure, 8-cyanoquinoline is obtained in a very good yield.

By starting from 5.8-dichlorquinoline, 5.8-dicyanoquinoline is obtained in the same way.

Example 9

A mixture of 500 parts of benzyl chloride, 355 parts of cuprous cyanide, 200 parts of benzyl cyanide and 50 parts of cuprous chloride is heated while stirring. The reaction commences at from 150° to 160° C. The mixture is heated for a short time at from 160° to 165° C. By distilling under reduced pressure, entirely pure benzyl cyanide is obtained in a yield of from about 85 to 90 per cent of the calculated yield.

Example 10

A mixture of 31 parts of Bz1-bromo-8-azabenzanthrone, 9.8 parts of cuprous cyanide, 8.7 parts of pyridine and 150 parts of nitrobenzene is heated for some hours at 180° C. After cooling, the Bz1-cyano-8-azabenzanthrone formed is filtered off by suction, washed with alcohol, then with dilute sulphuric acid and finally with water. It forms straw-yellow needles which melt at from 305° to 306° C. and which dissolve in strong sulphuric acid giving a yellow coloration and a green fluorescence. The yield is almost the calculated yield.

Example 11

A melt of 500 parts of 1-amino-3-chlor-4-nitrobenzene, 265 parts of cuprous cyanide and 230 parts of pyridine is heated for about an hour at from 160° to 170° C. and then poured into ice-cold 15 per cent hydrochloric acid. The 1-amino-3-cyano-4-nitrobenzene thus formed is then filtered off by suction and washed with water. The compound crystallizes from ethanol in form of yellow needles which melt at from 190° to 191° C. The yield amounts to about 90 per cent of the calculated yield.

In the same manner there is obtained 1-acetylamino-3-cyano-4-nitrobenzene from 1-acetylamino-3-chlor-4-nitrobenzene, 1-amino-2-chlor-4-nitro-5-cyanobenzene (melting point 213°–214° C.) from 1-amino-2.5-dichlor-4-nitrobenzene, 1-amino-2-methoxy-4-cyano-5-nitrobenzene (melting point 222° C.) from 1-amino-2-methoxy-4-chlor-5-nitrobenzene and 1-oxalylamino-2-methoxy-4-cyano-5-nitrobenzene (melting point 220° C.) from 1-oxalylamino-2-methoxy-4-chlor-5-nitrobenzene.

Example 12

A mixture of 500 parts of 2-chlor-5-nitrobenzene-1-carboxylic acid, 230 parts of cuprous cyanide, 210 parts of pyridine and 600 parts of dichlorbenzene is heated at from 150° to 160° C. until it no longer contains starting material. After cooling the 4-nitrophthalimide thus formed is filtered off by suction, washed with methanol, then with dilute aqueous ammonia solution and finally with water. The compound is thus obtained in an entirely pure state. The yield amounts to 75–85 per cent of the calculated yield.

Similarly, 3-nitrophthalimide is obtained from 2-chlor-6-nitro-1-benzoic acid.

Example 13

A mixture of 500 parts of 2.4-dichlorbenzene-1-carboxylic acid, 240 parts of cuprous cyanide, 220 parts of pyridine and 900 parts of dichlorbenzene is heated for about an hour at from 165° to 170° C. The 4-chlorphthalimide thus formed is obtained in an entirely pure state in the same manner as described in Example 12. The yield amounts to 80–90 per cent of the calculated yield.

In a similar manner, 2.3-dichlor-1-benzoic acid may be converted into 3-chlorphthalimide (melting point 233° C.).

Example 14

A mixture of 50 parts of 1.8-chlornitronaphthalene, 22 parts of cuprous cyanide, 19 parts of pyridine and 50 parts of nitrobenzene is heated for some hours at from 190° to 195° C. The nitrobenzene is then removed by steam and the residue is purified by washing with concentrated hydrochloric acid and water. 1.8-cyano-nitronaphthalene is thus obtained in a yield being more than 90 per cent of the calculated yield. By re-dissolution from boiling alcohol the compound is obtained in an entirely pure state (melting point 138° C.).

Example 15

A mixture of 100 parts of dibromo-allo-mesonaphthodianthrone, 32 parts of cuprous cyanide, 29 parts of pyridine and 360 parts of nitrobenzene is heated for about 6 to 8 hours at from 200° to 205° C. and worked up in the manner described in Example 3. Dicyano-allo-mesonaphthodianthrone is thus obtained in the calculated yield in the form of red-brown crystals; the compound dyes cotton from a violet vat yellow-red shades.

Example 16

A mixture of 50 parts of ortho-dichlorbenzene, 61 parts of cuprous cyanide, 49 parts of cuprous bromide and 130 parts of quinoline is heated for about 4 hours at 200° C. Then the quinoline and the resulting ortho-chlorcyanobenzene are distilled off under reduced pressure. The ortho-chlorcyanobenzene is obtained in a pure state by shaking it with dilute hydrochloric acid and distillation.

Example 17

A mixture of 1000 parts of ortho-chlornitrobenzene, 100 parts of pyridine, 192 parts of cuprous cyanide and 220 parts of sodium cyanide is heated while stirring for about 1½-2 hours at from 180° to 185° C. Then steam is introduced into the melt having still a temperature of more than 100° C., until the little amount of by-products and the main portion of pyridine are distilled; the ortho-cyanonitrobenzene formed is obtained in a state free from copper salts by mixing it with sodium cyanide solution, filtering off by suction and washing with sodium cyanide solution and then with water. The yield of ortho-cyanonitrobenzene is 95 to 97 per cent of the calculated yield.

Instead of sodium cyanide potassium cyanide may also be employed.

The said amount of cuprous cyanide may also be replaced by a mixture of 300 parts of cuprous chloride and 100 parts of sodium cyanide.

Example 18

A mixture of 1000 parts of 4-chlor-3-nitro-1-trifluormethylbenzene, 576 parts of quinoline, 200 parts of cuprous chloride and 400 parts of cuprous cyanide is heated while stirring for some hours at 185° C. Then the melt is stirred into a mixture of 2800 parts of concentrated hydrochloric acid and 2800 parts of ice. By shaking the liquid with ether and then evaporating the ether the 4-cyano-3-nitro-1-trifluormethylbenzene is obtained in the form of a yellow oil which boils at from 156° to 158° C. under a pressure of 18 to 19 mm. (mercury gauge), and solidifies after standing for some time. The melting point lies at between 47 and 48° C.

Example 19

A mixture of 250 parts of 1-bromo-2-acetyl-aminonaphthalene, 90 parts of cuprous cyanide and 79 parts of pyridine is heated for about 1½ hours at 190° C. The melt is then stirred into 1000 parts of concentrated aqueous ammonia solution and the resulting 1-cyano-2-acetylaminonaphthalene is filtered off by suction. By redissolution from boiling alcohol the compound is obtained in an entirely pure state (melting point 167° C.); the yield amounts to from 80 to 85 per cent of the calculated yield.

Example 20

A mixture of 300 parts of 2.5-dichloracetophenone, 150 parts of cuprous cyanide and 131 parts of pyridine are heated while stirring for from 1½ to 2 hours at from 180° to 185° C. After working up the 2-cyano-5-chloracetophenone, melting at from 276° to 277° C. is obtained.

2-cyanoacetophenone may be obtained from 2-chloracetophenone in the same way.

Example 21

A mixture of 350 parts of alpha-bromopyridine, 192 parts of pyridine and 218 parts of cuprous cyanide is heated while stirring for 1 to 1½ hours at from 135° to 140° C. Then the mass is stirred into 700 parts of a 25 per cent aqueous ammonia solution. After shaking with ether, drying the ether solution with anhydrous sodium sulphate and evaporating the ether a pale yellow oil is obtained. By distillation under reduced pressure alpha-cyanopyridine is obtained in an entirely pure state in a yield of 90 per cent of the calculated yield.

Example 22

A mixture of 300 parts of 2.5-dichlorbenzoic ethyl ester, 118 parts of pyridine and 134 parts of cuprous cyanide is heated while stirring for about an hour at from 180° to 185° C. After working up 2-cyano-5-chlorbenzoic ethyl ester is obtained in a yield of from 85 to 90 per cent. By recrystallization from ethanol the compound is obtained in an entirely pure state; it melts at from 94° to 94.5° C.

By starting from other derivatives of the ortho-chlorbenzoic ester, as for example from 2-chlor-4-nitrobenzoic ester, the corresponding derivatives of the ortho-cyanobenzoic ester are obtained. In the same way there are obtained the corresponding ortho-cyanobenzoic esters from ortho-chlorbenzoic esters.

Example 23

A mixture of 671 parts of cuprous cyanide, 538 parts of cuprous bromide and 144 parts of quinoline is heated while stirring at from 235° to 240° C. Then a mixture of 500 parts of 1.4-dichlorbenzene with 35 parts of quinoline is allowed to drop into the liquid. The whole mixture is then heated for some hours at from 240° to 245° C. and the quinoline and the resulting 1.4-dicyanobenzene are distilled off. The latter compound is obtained in an entirely pure state by separating the quinoline with dilute hydrochloric acid.

In the same manner cyanobenzene is obtained from chlorbenzene.

Example 24

A mixture of 250 parts of 2.4-dibromoaniline, 195 parts of cuprous cyanide and 172 parts of pyridine is heated while stirring for some hours at from 180° to 185° C. After working up in the usual manner and redissolution from chlorbenzene, 2.4-dicyano-1-aminobenzene is obtained in an entirely pure state. The compound melts at from 217° to 218° C.

By starting from 2.4-dibromo-1-acetylaminobenzene 2.4-dicyano-1-acetylaminobenzene melting at from 171° to 172° C. is obtained.

Example 25

A mixture of 500 parts of ortho-chloranisol, 346 parts of cuprous cyanide, 276 parts of cuprous bromide and 750 parts of quinoline is heated while stirring for some hours at from 225° to 230° C. Then the melt is dissolved after cooling in strong hydrochloric acid; the liquid is diluted with an equal amount of water and shaken with ether. After washing the ether solution with water and alkali it is dried and the ether is evaporated. The remaining 1-cyano-2-methoxybenzene is obtained in an entirely pure state by distillation.

Example 26

A melt of 500 parts of 4-brom-1-acetylaminobenzene, 70 parts of cuprous cyanide, 78 parts of sodium cyanide and 62 parts of pyridine is heated for about 1½ hours while stirring at from 170° to 180° C. and then stirred into 1000 parts of aqueous 20 per cent ammonia solution. The 4-cyano-1-acetylaminobenzene thus formed is filtered off by suction. It is obtained entirely pure by dissolving in strong hydrochloric acid and precipitating with water. The yield amounts to more than 90 per cent of the calculated yield.

Example 27

A solution of 500 parts of 2-acetylamino-3-bromoanthraquinone, 2500 parts of nitrobenzene, 126 parts of pyridine and 143 parts of cuprous cyanide is heated for about 2 hours at from 185° to 190° C. Then the 2-acetylamino-3-cyanoanthraquinone thus formed is filtered off by suction after cooling. It is obtained in an entirely pure state when washing with methanol, strong hydrochloric acid and finally with water. It melts at from 320° to 321° C.

Example 28

A mixture of 44 parts of 3′.5′.6′-trichloranthraquinonebenzeneacridone, 10 parts of cuprous cyanide, 12 parts of pyridine and 400 parts of nitrobenzene is boiled while stirring for 2 hours. After cooling the crystal pulp is filtered off by suction, washed with nitrobenzene and methanol and then freed with dilute nitric acid from the copper salts. Thus a mono-cyanodichloranthraquinonebenzeneacridone is obtained in a very good yield in the form of red-brown needles dissolving in strong sulphuric acid giving a yellow coloration. The compound dyes cotton from a blue-violet vat orange shades.

By starting from 4.3′.5′-trichloranthraquinonebenzeneacridone, 4-cyano-3′.5′-dichloranthraquinonebenzeneacridone is obtained in the same way in form of a dark-brown crystal powder having a rose-red tinge. The compound is soluble in strong sulphuric acid giving an orange-yellow coloration and dyes cotton from a blue-violet vat red shades.

Example 29

A mixture of 250 parts of 4-chlor-3-nitro-1-methoxybenzene, 120 parts of cuprous cyanide and 105 parts of pyridine is heated while stirring for about 1½ hours at from 180° to 185° C. and worked up in the usual manner. The 4-cyano-3-nitro-1-methoxybenzene is obtained after redissolution from ethanol in an entirely pure state; the yield is very good. The compound melts at from 136° to 137° C.

Example 30

A mixture of 250 parts of 4-chlor-3-nitrobenzoic acid, 124 parts of cuprous cyanide, 179 parts of quinoline and 40 parts of cuprous chloride is heated while stirring for about 1½ hours at from 180° to 185° C. After cooling the melt is dissolved in strong hydrochloric acid, diluted with an equal amount of water and shaken several times with ether. After washing the ether solution with water and drying it with sodium sulphate the ether is evaporated. The remaining 4-cyano-3-nitrobenzoic acid is obtained after redissolution from dichlorbenzene in an entirely pure form. The compound melts at from 205° to 206° C.

In the same way, 4-chlor-3-nitrobenzamide may be converted into 4-cyano-3-nitrobenzamide. 2-chlor-1-nitrobenzene-5-sulphonamide yields 2-cyano-1-nitrobenzene-5-sulphonamide. From 2-chlor-1-nitro-5-ethylsulphonebenzene, 2 - cyano-1-nitro-5-ethylsulphonebenzene is obtained.

Example 31

A mixture of 500 parts of 2.4.6-tribromo-1-amino-benzene, 449 parts of cuprous cyanide and 390 parts of pyridine are heated while stirring for about 1½ to 2 hours at from 180° to 185° C. After cooling the melt is pulverized and treated with about 20 per cent aqueous sodium cyanide solution until the residue no longer contains copper salts. The 2.4.6-tricyano-1-aminobenzene thus formed is filtered off by suction and washed with water. By redissolution from acetone and then from nitrobenzene the compound is obtained in form of a pale yellow powder which is very difficultly soluble in the greatest part of organic solvents.

Example 32

A mixture of 500 parts of 1-trifluormethyl-3-methoxy-4-chlorbenzene, 234 parts of cuprous cyanide, 60 parts of cuprous chloride and 337 parts of quinoline is heated for several hours at from 200° to 210° C. After working up, 1-trifluormethyl-3-methoxy - 4 - cyanobenzene is obtained in a good yield. It is a colorless compound which melts at from 64° to 65° C. and boils at between 90° and 92° C. at a pressure of 2 mm. (mercury gauge).

Example 33

A mixture of 300 parts of 3-brom-4-chlorbenzotrifluoride, 113 parts of cuprous cyanide and 163 parts of quinoline is heated while stirring at about 180° C. for several hours. After working up, 3-cyano-4-chlorbenzotrifluoride is obtained. It boils at between 210° and 212° C.

Similarly, 4-chlor-1-trifluormethylbenzene may be converted into 4-cyano-1-trifluormethylbenzene.

What we claim is:

1. A process of producing nitriles of cyclic compounds which comprises heating cyclic halogen compounds with as many molecular proportions of cuprous cyanide and at the most as many molecular proportions of a cyclic base as halogen atoms are to be replaced in the said cyclic halogen compounds at temperatures not exceeding 200° C., in the absence of diluents capable of dissolving cuprous cyanide.

2. A process of producing nitriles of cyclic compounds which comprises heating cyclic halogen compounds with as many molecular proportions of cuprous cyanide and at the most as many molecular proportions of pyridine as halogen atoms are to be replaced in the said cyclic halogen compounds at temperatures not exceeding 200° C., in the absence of diluents capable of dissolving cuprous cyanide.

3. A process of producing nitriles of cyclic compounds which comprises heating cyclic halogen compounds with as many molecular proportions of cuprous cyanide and at the most as many molecular proportions of quinoline as halogen atoms are to be replaced in the said cyclic halogen compounds at temperatures not exceeding 200° C., in the absence of diluents capable of dissolving cuprous cyanide.

4. A trifluormethyl-benzonitrile formula

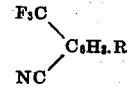

wherein R stands for a member of the class consisting of hydrogen, halogen, the nitro group and the alkoxy groups.

5. The trifluormethyl-benzonitrile of the formula

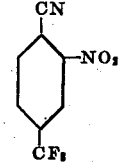

6. The trifluormethyl-benzonitrile of the formula
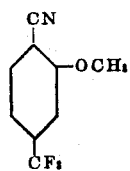
7. The trifluormethyl-benzonitrile of the formula
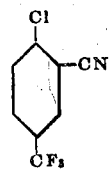
WILLY BRAUN.
KARL KOEBERLE.